United States Patent Office 3,332,812
Patented July 25, 1967

3,332,812
POLYBUTADIENE-$N_2F_4$ ADDITION PRODUCT
Donald A. Guthrie, Cranford, N.J., assignor to Esso Research and Engineering Company, a corporation of Delaware
No Drawing. Filed Mar. 8, 1961, Ser. No. 94,393
8 Claims. (Cl. 149—109)

This invention relates to high-energy polymers containing an increased proportion of $NF_2$ groups per carbon atom for use as oxidizer-binders in solid rocket propellants, and relates to the preparation of such high-energy polymers.

The present invention is concerned, particularly, with improvements attained over the process and products described in U.S. application Ser. No. 36,084, filed June 14, 1960 by Donald A. Guthrie and John P. Longwell.

Binders are important ingredients for imparting strength and rigidity to solid rocket composites, which may contain powdered solid fuel ingredients, e.g. metals, metal hydrides, powdered oxidizer solids, and oxidizer liquids. Many of such composites require as much as 20 to 35 wt. percent of binder and this requirement makes necessary an increase in the energy value of the binder, which means increasing the $NF_2/C$ ratio in the present instance. In previous work, $N_2F_4$ was added to polymers such as polybutadiene to yield a product containing only up to about 58 wt. percent of $NF_2$, making the ratio roughly $1NF_2$ per 2.8 carbon atoms in the polymer. The further work of the present invention has shown that the $NF_2$ content of a polybutadiene can be increased to a level of close to 66 wt. percent ($1NF_2/2$ carbon atoms) by use of an appropriate polymer feed (cis-1,4-polybutadiene) and reaction conditions.

Information obtained with the present invention shows that the previous limitation on introducing more $NF_2$ groups into unsaturated hydrocarbon polymers, including polybutadienes, to approach the theoretical of $1NF_2/2$ C may be the actual loss of double bonds as a result of cyclization and cross-linking. This loss of double bonds was confirmed by nuclear magnetic resonance studies on the final products and by the failure of such products to add $Br_2$. The use of high purity cis-1,4-polybutadiene as the starting reactant polymer which has essentially all double bonds within the polymer chain rather than in the pendant position aids in eliminating the loss of double bonds other than by saturation through reaction with $N_2F_4$.

Cis-1,4-polybutadiene is obtained by polymerizing butadiene according to the method employing heterogeneous catalysis disclosed by the Belgian Patent 551,851. These polymers may have molecular weights in the range of about 1,000 to 100,000 for reaction with $N_2F_4$ to make the desired oxidizer binder product.

Reaction conditions that have to be carefully selected and controlled for producing the binder having $1NF_2/2$ carbon atoms involve principally the reaction temperature, pressure, solvent concentration, agitation and time.

The molecular weight of the polymer is not in itself an independent factor controlling the ultimate amount of $N_2F_4$ that can be added to the polybutadiene. Also, the solution concentration of the polymer in a solvent is not in itself an independent critical factor. The concentration of the polymer can be increased as the molecular weight of the polymer is lower to obtain a solution that is not too viscous for the reaction. Thus for a 100,000 molecular weight polymer a 5% concentration of the polymer in a solvent such as benzene is satisfactory for obtaining addition of $N_2F_4$ to substantially all the double bonds originally in the polymer. The solvent used must be non-reactive. Benzene is a very good solvent for the starting materials but the final product is only moderately soluble in benzene. Nitromethane and acetonitrile are very good solvents for the final product. Dual solvents may be used in combination for a one-step process or separately in two or more successive stages. Carbontetrachloride is a suitable solvent that permits use of higher reaction temperatures, but it is somewhat reactive in causing a small amount of chlorination as the temperatures are elevated. The minimum reaction temperature in adding $N_2F_4$ to the polymer is 75° C. to obtain a fast enough rate of reaction of the $N_2F_4$. The upper limit of the reaction temperature depends on the solvent used. In using benzene the upper limit is 95° C. for safety against explosion. In using $CCl_4$, higher temperatures, e.g. 80° C. up to about 175° C. may be used but with some chlorination resulting.

The initial rate of the $N_2F_4$ take-up appears to be limited by gas-liquid diffusion to some extent. The diffusion rate is affected by viscosity, which, in turn is affected by molecular weight, molecular type, concentration and solvent type. The solution of cis-1,4-polybutadiene of 100,000 molecular weight at 5.8 wt. percent concentration in benzene has about the same initial viscosity as 20 to 28% solutions of 68% 1,2/32% 1,4 polybutadiene, having a molecular weight of only 3500. More rapid diffusion of the $N_2F_4$ reactant into contact with the polymer molecules is important as the reaction temperature is raised to above 75° C. to maintain a high rate of $N_2F_4$ reaction.

Agitation of the reaction mixture is very important and may be provided by use of an electric vibrator. The importance of agitation has been shown by experiments on reacting samples of the same polymer under the same temperature conditions, one with agitation and the other without agitation. The polymer reacted with agitation gave a product that had twice the amount of double bonds saturated by $N_2F_4$ as the product obtained without agitation. Other studies showed that an unsaturated hydrocarbon polymer reached a maximum $N_2F_4$ absorption point in a much shorter time when the reaction mixture is agitated. Further work showed that a lower level of reaction resulted at temperatures below 75° C. and a still lower level of reaction resulted at temperatures below 75° C. without agitation.

The $N_2F_4$ pressure is an important variable. To make the polybutadiene of the highest $NF_2$ content, it is necessary to use pressures above 400 p.s.i., preferably up to about 460 p.s.i. or higher. The pressure is related to the gas diffusion rate and to the reaction time which can be tolerated. The purity of the reactants is important. The $N_2F_4$ should not contain impurities which lead to cross-linking and product insolubility, such as certain nitrogen oxide impurities. Insolubility also occurs when air comes in contact with the product containing even traces of $N_2F_4$.

Details of the synthesis process are given in the following examples.

Example I

A series of reactions was carried out using cis-1,4-polybutadiene of approximately 100,000 molecular weight to be reacted with excess tetrafluorohydrazine ($N_2F_4$) at reaction temperature of 80° C. in stainless steel bombs of 5.1 to 7.6 cc. capacity. The reactor bomb was attached to an electric bibrator and contained a small piece of stainless steel to be shaken therein for aiding agitation. The polymer was dissolved in benzene in concentrations of 4.5 to 5.8 wt. percent. Bombs were frozen in liquid nitrogen after the solution of polymer had been introduced and air was evacuated from the bomb. Thereafter, $N_2F_4$ was introduced into the bomb to build up a pressure in the range of about 440 to 450 p.s.i.a. The bomb was heated to 80° C. and shaken during the period of reaction for definite periods in the range from 3 to 16 hours. At the end of each period of reaction, the $N_2F_4$ was withdrawn from the bomb and the solvent was then stripped from the product under vacuum distillation. The reacted polymer product was dried in vacuo and evaluated by analysis for percent N and percent F to determine the weight percent $NF_2$ content and percent saturation of the ethylenic double bonds. Results from three representative tests carried out in the manner described for different periods of time are tabulated as follows:

TABLE.—$N_2F_4$ ADDITION TO CIS-1,4-POLYBUTADIENE REACTION TEMP., 80° C.

| Polymer Conc. in Benzene (wt. percent) | $N_2F_4$ (p.s.i.a.) | Time, hrs. | PRODUCT | |
|---|---|---|---|---|
| | | | Wt. Percent $NF_2$ | Percent Sat'n of C=C |
| 4.5 | 450 | 3.2 | 54.4 | 62 |
| 4.5 | 445 | 12.0 | 62.9 | 88 |
| 5.8 | 440 | 16.0 | 65.8 | 100 |

Each of the products was a hard, tan, soluble rubbery material.

By plotting the percent saturation of the double bonds as ultimate points against the reaction period in hours, these points fall on a sloped straight line, which shows no diminution in rate of reaction. In contrast, on treating other types of polybutadienes containing large amounts of the 1,2 or side vinyl type of double bonds in addition to the 1,4 or internal double bond herein reported, the rates of reaction are found to approach a maximum plateau in a reaction period of about 10 hours with the percentage saturation of double bonds by $N_2F_4$ no higher than about 76% even when using a reaction temperature of 80° C. In using lower reaction temperatures, i.e. below 75° C. the plateau of percent saturation of double bonds by $N_2F_4$ is even lower e.g. 58% at 25 °C. even after 60 hours of reaction time with agitation and only about 30% after 60 hours reaction time without agitation. In these compared tests, other factors, such as pressure, were at the same level and the results showed the importance of using a sufficiently high reaction temperature with agitation. Accordingly, the technique of the present invention is first to have achieved 80 to 100% saturation of polybutadiene double bonds by $N_2F_4$ to give the polymer a content in the range of 62 to 66 wt. percent of $NF_2$ thereby approaching the ratio of $1NF_2/2C$ (65.8 wt. percent $NF_2$). With this technique the addition reaction of the polymer with the $N_2F_4$ continues at a fairly constant rate from the beginning until approximately 100% saturation of the originally present double bonds by the $N_2F_4$, when the heating is terminated, i.e. in a reaction period less than about 16 hours.

Through the use of appropriate conditions determined in the present invention, progress was made toward increasing $N_2F_4$ addition and yields using polymers containing the 1,2-polybutadienes or mixtures thereof with 1,4-polybutadienes, the important factors being sufficiently elevated reaction temperature, pressure and adequate mixing. With the polybutadienes other than the cis-1,4, it was found nevertheless difficult to obtain more than 75% saturation of double bonds. For example, using the same kind of polymer sample containing 1,2 and 1,4-polybutadienes with a mixed solvent of benzene and acetonitrile, the same temperature of 80° C., time of 6 hours by increasing the $N_2F_4$ pressure from below 400 p.s.i. to 460 p.s.i. the double bond saturation in agitated reaction mixture runs was significantly increased from about 68% to about 75%. Without agitation the amount of saturation is substantially lower. Also, the yields were substantially increased with increased pressure. The mixed solvent (21% acetonitrile-amine free and 79% benzene) was found to aid in eliminating cross-linking which would lower the $NF_2$ content.

Degradation of the polymer tends to occur by "overcooking" which arises from having the reaction temperature too high and from insufficient mixing, and from a reaction time that is too long. The degraded polymers are useless as binders.

The addition of solvent e.g. acetonitrile near the end of a run for dilution, aids to increase fluidity and as a safety measure. The polymer solution viscosity depends on polymer molecular weight and concentration. Thus, it is advantageous to use a low molecular weight polymer feed stock to allow use of a higher polymer solute concentration for higher yields while permitting proper agitation and gas diffusion into the liquid. With an intermediate molecular weight polymer (about 17,000) the concentration of polymer may be about 21% without making the solution too viscous. With a still lower molecular weight polymer (2,000 to 10,000) 30 to 40% concentration of polymer may be used.

To obtain a large liquid-gas interface and good agitation, stainless helices have been welded into a reactor bomb designed to provide small gas space and to be shaken.

There is an incentive in having the $N_2F_4$-polybutadiene product contain as high amount of $NF_2$ as possible for aiding plasticizing of the product to a rubbery material by the addition of liquid $CNF_2$ compounds, such as tris difluoramino propane, tetrakis difluoramino butane, and other $CNF_2$ compounds. The product is soluble in acetonitrile, nitromethane and other moderately polar solvents.

$N_2F_4$-polybutadiene products have been obtained with varying impact sensitivity, e.g. 6 to 17 kg. in. and thermal stability, however, stabilizing materials may be added or certain treatments can be made to remove contaminants which promote instability, e.g. metal contaminants.

Prior treatment, such as washing with aqueous isopropanol and drying with silica gel, has improved the polymers for the reaction.

The products obtained from mixtures of the cis and trans 1,4-polybutadienes have not given products as stable as the products from cis-1,4 polybutadiene but they have with the preferred reaction conditions of the present invention given products containing about 62 to 63 wt. percent $NF_2$ and more than 80% saturation of double bonds by $N_2F_4$ addition. This is demonstrated by the reaction of runs on cis (41%) trans (50%)-1,4-polybutadiene of about 10,000 molecular weight, 3.4 wt. percent concentration of the polymers in acetonitrile treated with $N_2F_4$ under 433 p.s.i. pressure at 85° C. for 10 hours to obtain a product having a 62 to 63 wt. percent $NF_2$ content. Similarly, improved results are obtained when using an all trans 1,4-polybutadiene as feed polymer with the improved technique of the present invention.

With the production of the high $NF_2$ content polybutadiene binders, a number of high-energy rocket propellant formulations have been determined. These binders have a composition close to that of the following formula:

$$[C_4H_6(NF_2)_2]_x$$

wherein $x$ indicates the number of units. A binder of this composition has a density of approximately 1.45. A large variety of formulations containing from 15% to as high as 54 wt. percent of that formula $[C_4H_6(NF_2)_2]_x$ as binder have been determined to have Isp values in the range of 275 to 290 seconds, such as when it is used with powdered boron and hexanitroethane oxidizer or with tetrakis ($NF_2$) butane and the oxygen oxidizer. The oxygen oxidizer may be various compounds such as nitronium perchlorate, ammonium perchlorate, hydrazinium nitroformate, etc.

A specific example of a propellant formulation of Isp about 276 seconds is 29.96 wt. percent $C_4H_6(NF_2)_4$, 5.48 wt. percent B, 39.7 wt. percent $N_2H_5C(NO_2)_3$, and 24.82 wt. percent $[C_4H_6(NF_2)_2]_x$ binder. Another formulation having an Isp of 290 is 6.69 wt. percent $C_4H_6(NF_2)_4$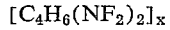

7.15 wt. percent B, 53.80 wt. percent $C_2(NO_2)_6$, and 30 wt. percent of the $[C_4H_6(NF_2)_2]_x$ binder.

What is claimed is:

1. Polybutadiene-$N_2F_4$ addition product containing from 62 to about 66 wt. percent of $NF_2$ added to the double bonds of polybutadiene.

2. 1,4-polybutadiene-$N_2F_4$ addition product containing from 62 to about 66 wt. percent $NF_2$ and having 80 to 100% saturation of double bonds by $N_2F_4$ which adds $NF_2$ groups to carbon atoms having an ethylenic double bond in the polybutadiene.

3. A high-energy polymer useful as a rocket propellant oxidizer-binder, said polymer having the recurring unit formula $[C_4H_6(NF_2)_2]_x$ wherein $x$ represents the number of recurring units, said polymer being further characterized by containing from about 62 wt. percent to 66 wt. percent $NF_2$.

4. A high-energy solid propellant binder consisting essentially of an $N_2F_4$ saturated cis 1,4-polybutadiene containing 1$NF_2$ group per 2 carbon atoms.

5. The method of forming a high-energy polymer having a high $NF_2$ content, which comprises reacting 1,4-polybutadiene with $N_2F_4$ under a pressure of 400 to about 460 p.s.i. and at the reaction temperature of at least 75° C. with intimate mixing of the $N_2F_4$ with the polybutadiene and an inert solvent by agitation for a period sufficient to saturate from about 80% to 100% of double bonds in the polybutadiene by addition of the $N_2F_4$.

6. The method as in claim 5, wherein the solvent is carbon tetrachloride and the reaction temperature is in the range of 80° C. to about 175° C.

7. The method as in claim 5, wherein the polybutadiene is principally cis 1,4-polybutadiene.

8. The method as in claim 5, in which reaction is maintained at substantially constant rate until about 100% of double bonds in the polybutadiene are saturated by addition of $N_2F_4$ in a total reaction period less than about 16 hours.

References Cited

Farber: Astronautics, August 1960, pp. 39, 40 and 42.

CARL D. QUARFORTH, *Primary Examiner.*

LEON D. ROSDOL, ROGER L. CAMPBELL,
*Examiners.*

B. R. PADGETT, J. W. WHISLER, L. A. SEBASTIAN,
*Assistant Examiners.*